(No Model.)
E. EINFELDT.
APPARATUS FOR WELDING.
No. 592,768. Patented Nov. 2, 1897.
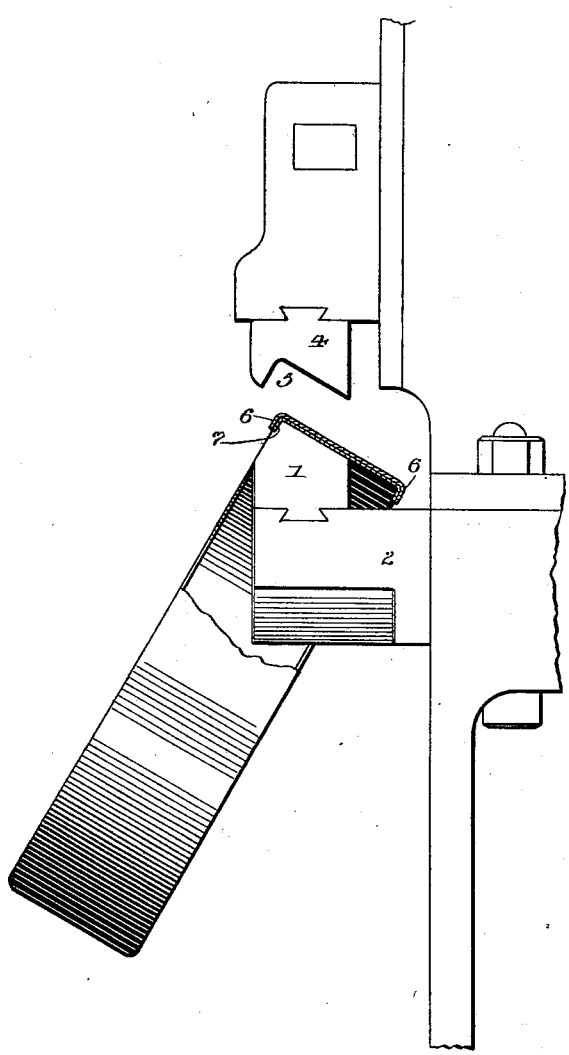
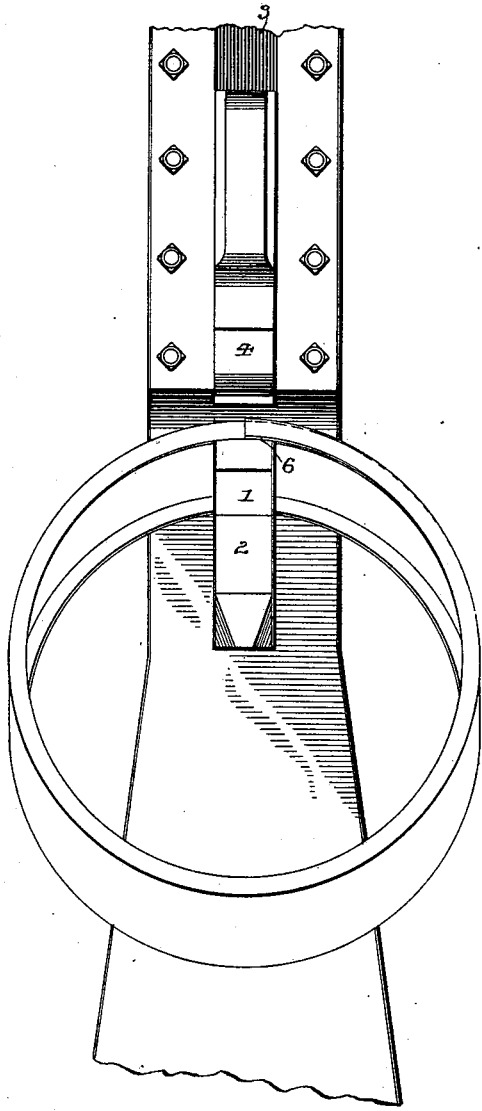
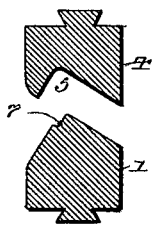
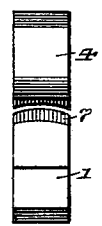
WITNESSES:
Arthur Ashley
P. S. Elmore
INVENTOR
Emil Einfeldt
BY
Phil. T. Dodge
ATTORNEY.

UNITED STATES PATENT OFFICE.

EMIL EINFELDT, OF DAVENPORT, IOWA, ASSIGNOR TO THE BETTENDORF METAL WHEEL COMPANY, OF IOWA.

APPARATUS FOR WELDING.

SPECIFICATION forming part of Letters Patent No. 592,768, dated November 2, 1897.

Application filed April 17, 1897. Serial No. 632,582. (No model.)

*To all whom it may concern:*

Be it known that I, EMIL EINFELDT, of Davenport, county of Scott, and State of Iowa, have invented a new and useful Improvement in Apparatus for Welding, of which the following is a specification.

This invention has reference to an apparatus for welding; and it relates more particularly to the welding together of the ends of metal wheel tires or rims having flanges formed on their edges. In welding tires of this form considerable difficulty has been experienced in attaining a satisfactory joint by reason of the presence of the two flanges; and to overcome this objection I propose to weld the flanges on one side of the tire and a portion of the tread of the latter at one operation and then by another operation complete the joint by welding the other flanges and the remainder of the tread. I am enabled by these successive steps to form a perfect and effective joint throughout the transverse lap of the two ends of the tire.

In the drawings I have represented an apparatus which has been found to answer to a satisfactory degree the aim in view, which apparatus possesses novel features which will be clearly pointed out in the claims.

In the accompanying drawings, Figure 1 is a side elevation of my improved apparatus, a flanged tire being shown in position preparatory to being welded. Fig. 2 is a front elevation of the same. Fig. 3 is a sectional view showing the form of the anvil for supporting the tire to be welded and the form of the welding or pressure head. Fig. 4 is a front elevation of said parts.

Referring to the drawings, the apparatus which I employ in carrying my invention into effect embodies a supporting-anvil 1, having one face inclined in one direction and curved to correspond to the contour of the tire and adapted to support a portion of the tread and having another face inclined in the opposite direction and adapted to give support to the overlapped flanges at one edge of the tire, the inclination of these faces causing the tire to be supported at an inclination from the vertical, as clearly shown in Fig. 1. This anvil is sustained in a fixed position on a suitable frame or bed 2, which is extended upward above the anvil, where it is provided with a vertical guideway 3, in which is mounted to move vertically a welding or pressure head 4, adapted to be operated in any suitable manner to coact with the anvil. The pressure-head is formed in its under side with an angular recess 5 to receive the anvil, the arrangement being such that when the head is lowered on the anvil the portion of the tire supported thereby will be pressed between the head and anvil.

In proceeding to weld a tire in accordance with my invention by this apparatus the tire is first provided on its edges in any suitable manner with flanges 6 and bent into circular form. The flanges on one end are spread apart slightly to receive the flanges on the other end, and the two ends are brought together and overlapped a short distance. In this condition, after being previously heated to the proper welding temperature, the overlapped ends are seated on the anvil, which latter has one of its supporting sides recessed, as at 7, Fig. 3, to receive the inner flange, and the pressure-head is lowered on the tire and forcibly pressed into contact therewith, thereby forcibly pressing together the overlapped flanges supported by one of the sloping sides of the anvil and the overlapping portions of the tread supported by the other sloping side of the anvil. After this operation the pressure-head is raised to release the tire and the latter is removed from the anvil and turned around and again seated in place, with the opposite flanges and the remaining portion of the tread resting on the anvil. The pressure-head is then brought forcibly into contact with the tire and the welding operation completed. It will be understood, of course, that the pressure-head may be operated to subject the parts to be welded to a series of blows, as a drop-hammer, or it may be operated to subject the parts to a steady and forcible pressure, as desired.

I prefer to support the tire in an inclined position while being welded for the reason that by so doing I am enabled to subject the tread and flanges to simultaneous pressure by the single head; but if so desired the same result may be attained by supporting the tire in a vertical or horizontal position and employing separate pressure devices to act conjointly on the flanges and tread.

Having thus described my invention, what I claim is—

1. In an apparatus for joining the ends of tires having flanged edges, the combination with a supporting-anvil having one face inclined in one direction and curved to correspond to the curvature of the tire and adapted to give support to a portion of the tread and having its other face inclined in the opposite direction and adapted to give support to the overlapped flanges at one side of the tire, of a recessed coacting pressure-head adapted to contact with the sustained parts and subject the same to pressure.

2. In an apparatus for welding the overlapped ends of tires having angular flanges on their edges, the combination with an anvil having one face inclined in one direction to support a portion of the tread and curved to correspond to the curvature of the tire and its other face inclined in the opposite direction and recessed to receive the underlapping flange, of a coacting pressure-head provided with a recess to receive the supported parts of the tire and subject the same to pressure.

In testimony whereof I hereunto set my hand, this 10th day of April, 1897, in the presence of two attesting witnesses.

EMIL EINFELDT.

Witnesses:
NATH. FRENCH,
MAY L. DODGE.